(12) United States Patent
Razzell et al.

(10) Patent No.: US 6,680,667 B2
(45) Date of Patent: Jan. 20, 2004

(54) ELECTRICAL CONDUCTOR WINDING AND A METHOD OF MANUFACTURING AN ELECTRICAL CONDUCTOR WINDING

(75) Inventors: Anthony G Razzell, Derby (GB); John J A Cullen, Derby (GB); Diane Holland, Rugby (GB)

(73) Assignee: Rolls-Royce plc, London (GB)

( * ) Notice: Subject to any disclaimer, the term of this patent is extended or adjusted under 35 U.S.C. 154(b) by 25 days.

(21) Appl. No.: 10/105,346

(22) Filed: Mar. 26, 2002

(65) Prior Publication Data

US 2002/0145500 A1 Oct. 10, 2002

(30) Foreign Application Priority Data

Apr. 4, 2001 (GB) ............................................. 0108402

(51) Int. Cl.$^7$ .............................................. H01F 27/30
(52) U.S. Cl. .................. 336/206; 336/195; 174/117 FF
(58) Field of Search ................... 174/117 FF; 310/201; 336/206, 173, 177, 186, 195

(56) References Cited

U.S. PATENT DOCUMENTS 5,527,997 A * 6/1996 Saen et al. ............... 174/126.2
5,760,516 A * 6/1998 Baumann et al. ........... 310/201

FOREIGN PATENT DOCUMENTS

| EP | 0 133 917 A |   | 3/1985 |
| EP | 0 233 464 | * | 5/1987 |
| EP | 0 243 626 A |   | 11/1987 |
| GB | 1 404 697 SP |   | 9/1975 |
| GB | 1 455 938 SP |   | 11/1976 |
| WO | PCT/GB97/03168 A |   | 6/1998 |

* cited by examiner

*Primary Examiner*—Anh T Mai
(74) *Attorney, Agent, or Firm*—W. Warren Taltavull; Manelli, Denison & Selter PLLC

(57) ABSTRACT

An electrical conductor winding (70) comprises a plurality of laminates of electrical insulation (72). Each laminate of electrical insulation (72) has a slot (78) on one surface (76). Each laminate of electrical insulation (70) has an electrical conductor (82) arranged in the slot (78). An electrical connector (84) connects the electrical conductor (82) in one laminate of electrical insulation (78) with the electrical conductor (82) in an adjacent laminate of electrical insulation (72). The laminates of electrical insulation (72) are arranged such that the surface (74) of one laminate of electrical insulation (72) abuts and is bonded to the surface (76) of an adjacent laminate of electrical insulation (12). The laminates of electrical insulation (12) comprise a glass-ceramic material. The electrical conductor windings allow active magnetic bearings, electric motors and electric generators to be used at temperatures up to 500° C. for example in gas turbine engines.

13 Claims, 3 Drawing Sheets

US 6,680,667 B2

ELECTRICAL CONDUCTOR WINDING AND A METHOD OF MANUFACTURING AN ELECTRICAL CONDUCTOR WINDING

FIELD OF THE INVENTION

The present invention relates to an electrical conductor winding and to a method of manufacturing an electrical conductor winding. The present invention relates in particular to an electrical conductor winding for an active electromagnetic bearing, an electrical generator or an electrical motor for use at relatively high temperatures.

BACKGROUND OF THE INVENTION

At the present electrical machines comprise one or more electrical conductor windings each of which has a polymeric insulation material. These electrical machines have a maximum operating temperature of the order of 200° C., due to the polymeric insulation material applied to the electrical conductor windings.

The use of specialist high temperature polymeric insulation material would enable the electrical machines to have a maximum operating temperatures of the order of 250° C. However, it is believed that stable, oxidation resistant, polymeric insulation material will not have maximum operating temperatures above 300° C.

There is a requirement for electrical machines with maximum operating temperatures of the order of 500° C. and above. These electrical machines for example are active electromagnetic bearings, electrical generators and electrical motors for use within gas turbine engines, particularly on the high-pressure shaft/rotor of a gas turbine engine. The use of active electromagnetic bearings may allow the simplification of the gas turbine engine by elimination of conventional bearings and oil systems.

As discussed above polymeric insulation material cannot be used at temperatures above about 300° C.

The use of an inorganic insulation material for the electrical conductors is a possibility. The inorganic insulation material may be based on ceramic cloths or ceramic coatings, applied to the electrical conductors. However, this is not desirable because the inorganic insulation material tends to be bulky limiting the packing density of the electrical conductor and the electrical conductors require potting in an inorganic cement. Additionally the manufacturing process is very labour intensive.

The use of an inorganic insulation material may be based on ceramic cloth and inorganic cement. However, this is not desirable because these inorganic insulation materials have poor thermal conductivity and would make the thermal management of the electrical conductor difficult. Additionally the porous nature of the inorganic cement tends to allow the inorganic insulation material to soak up fluids, for example water, oil or other lubricant. The presence of moisture tends to degrade the electrical insulation by allowing leakage currents to earth or between turns of the electrical conductor. The presence of oil tends to degrade the electrical insulation by forming carbon also allowing leakage currents to earth or between turns of the electrical conductor. Also the thermal expansion mismatch may cause damage to the insulation material during thermal cycling of the electrical conductor.

SUMMARY OF THE INVENTION

The present invention seeks to provide a novel electrical conductor winding which reduces, preferably overcomes, the above mentioned problems. The present invention also seeks to provide a novel method of manufacturing an electrical conductor winding.

Accordingly the present invention provides an electrical conductor winding comprising a plurality of laminates of electrical insulation, each laminate of electrical insulation having a first surface and a second surface, the first surface of each laminate of electrical insulation being flat and the second surface of each electrical insulation having a slot, at least one aperture extending through each laminate of electrical insulation from the slot to the first surface, each laminate of electrical insulation having an electrical conductor arranged in the slot, each aperture having an electrical connector to connect the electrical conductor in the slot in one laminate of electrical insulation with the electrical conductor in the slot in an adjacent laminate of electrical insulation, the laminates of electrical insulation being arranged such that the first surface of one laminate of electrical insulation abuts and is bonded to the second surface of an adjacent laminate of electrical insulation and the laminates of electrical insulation comprises a glass-ceramic material, the glass-ceramic material comprises at least one phase whose combined thermal expansion substantially matches the thermal expansion of the electrical conductor.

Preferably the at least one phase includes cristobalite, lithium zinc silicate, lithium disilicate, lithium metasilicate, enstatite, clinoenstatite or calcium orthosilicate.

Preferably the glass-ceramic material comprises silica, lithium oxide, zinc oxide, potassium oxide and phosphorus oxide.

One suitable glass-ceramic material comprises 59.2 wt % $SiO_2$, 9.0 wt % $LiO_2$, 27.1 wt % $ZnO$, 2.0 wt % $K_2O$ and 2.7 wt % $P_2O_5$.

The glass material comprising 12 to 14.5 wt % $Li_2O$, 2 to 2.6 wt % $ZnO$, 4.7 to 5.7 wt % $K_2O$, 8.2 to 10.2 wt % $Al_2O_3$, 0.31 to 0.39 wt % starch, 0.027 to 0.033 wt % $CeO_2$, 0.018 to 0.022 wt % $AgCl$ and the balance $SiO_2$ plus incidental impurities.

Preferably the electrical conductors comprise copper.

Preferably the electrical connectors comprise copper.

Preferably the electrical connectors are brazed to the electrical conductors.

Alternatively the electrical connectors are soldered to the electrical conductors by high electrical conductivity solder.

Preferably at least one of the electrical conductors is wound into a spiral. Preferably each of the electrical conductors is wound into a spiral.

Preferably the electrical conductor winding comprises an active electromagnetic bearing, an electrical generator or an electrical motor.

The present invention also provides a method of manufacturing an electrical conductor winding comprising (a) forming a plurality of laminates of electrical insulation, each laminate of electrical insulation having a first surface and a second surface, the first surface of each laminate of electrical insulation being flat, the second surface of each laminate of electrical insulation having a slot, the laminates of electrical insulation comprises a glass or a glass-ceramic material, the glass-ceramic material comprises at least one phase whose combined thermal expansion substantially matches the thermal expansion of the electrical conductor, (b) forming at least one aperture through each laminate of electrical insulation from the slot to the first surface, (c) placing an electrical conductor in the slot in each laminate of electrical insulation, (d) placing an electrical connector in the aperture in each laminate of electrical insulation to connect the electrical conductor in the slot in one laminate of electrical insulation with the electrical conductor in the slot in an adjacent laminate of electrical insulation, (e) stacking the laminates of electrical insulation such that the first surface of one laminate of electrical insulation abuts the second surface of an adjacent laminate of electrical insulation, (f) heating the stack of laminates of electrical insulation such the first surface of one laminate of electrical insulation bonds to the second surface of an adjacent laminate of electrical insulation.

The method may comprise an additional step (g) after or concurrent with step (f) of heating the stack of laminates of electrical insulation to convert the glass to a glass ceramic material.

Preferably the method comprises placing a layer of glass powder between the laminates of electrical insulation to bond the laminates of electrical insulation.

Preferably the method comprises electroforming the electrical conductors into the slots in the laminates of electrical insulation.

Preferably the electrical conductors comprise copper.

Preferably the method comprises forming the apertures in the laminates of electrical insulation at the same time as forming the slots in the electrical insulation.

Preferably the method comprises forming the apertures through the electrical conductors while the electrical conductor are in the slots.

Alternatively the method comprises forming the apertures through the electrical conductors while the electrical conductors are placed in the slots.

Preferably the electrical connectors comprise copper.

Preferably the method comprises placing a solder material or braze material between the electrical conductors and the electrical connectors.

The method may comprise press forming the laminates of electrical insulation in the glassy state and then turning the laminates of electrical insulation to a glass-ceramic.

Preferably the at least one phase includes cristobalite, lithium zinc silicate, lithium disilicate, lithium metasilicate, enstatite, clinoenstatite or calcium orthosilicate.

Preferably the glass-ceramic material comprises silica, lithium oxide, zinc oxide, potassium oxide and phosphorus oxide.

A suitable glass-ceramic material comprises 59.2 wt % $SiO_2$, 9.0 wt % $LiO_2$, 27.1 wt % ZnO, 2.0 wt % $K_2O$ and 2.7 wt % $P_2O_5$.

The method may comprise forming the slots in the laminates of the electrical insulation by photo-forming a glass material.

The method may comprise directing ultra violet light onto predetermined regions of the glass material, heat treating the glass to introduce crystal nucleation and growth in the predetermined regions of the glass material exposed to the ultra violet light, etching the glass material to remove glass material in the predetermined regions of the glass material to form the slots.

The glass material comprising 12 to 14.5 wt % $Li_2O$, 2 to 2.6 wt % ZnO, 4.7 to 5.7 wt % $K_2O$, 8.2 to 10.2 wt % $Al_2O_3$, 0.31 to 0.39 wt % starch, 0.027 to 0.033 wt % $CeO_2$, 0.018 to 0.022 wt % AgCl and the balance $S_1O_2$ plus incidental impurities.

BRIEF DESCRIPTION OF DRAWINGS

The present invention will be more fully described by way of example with reference to the accompanying drawings in which.

DETAILED DESCRIPTION OF THE INVENTION

Figure 1:
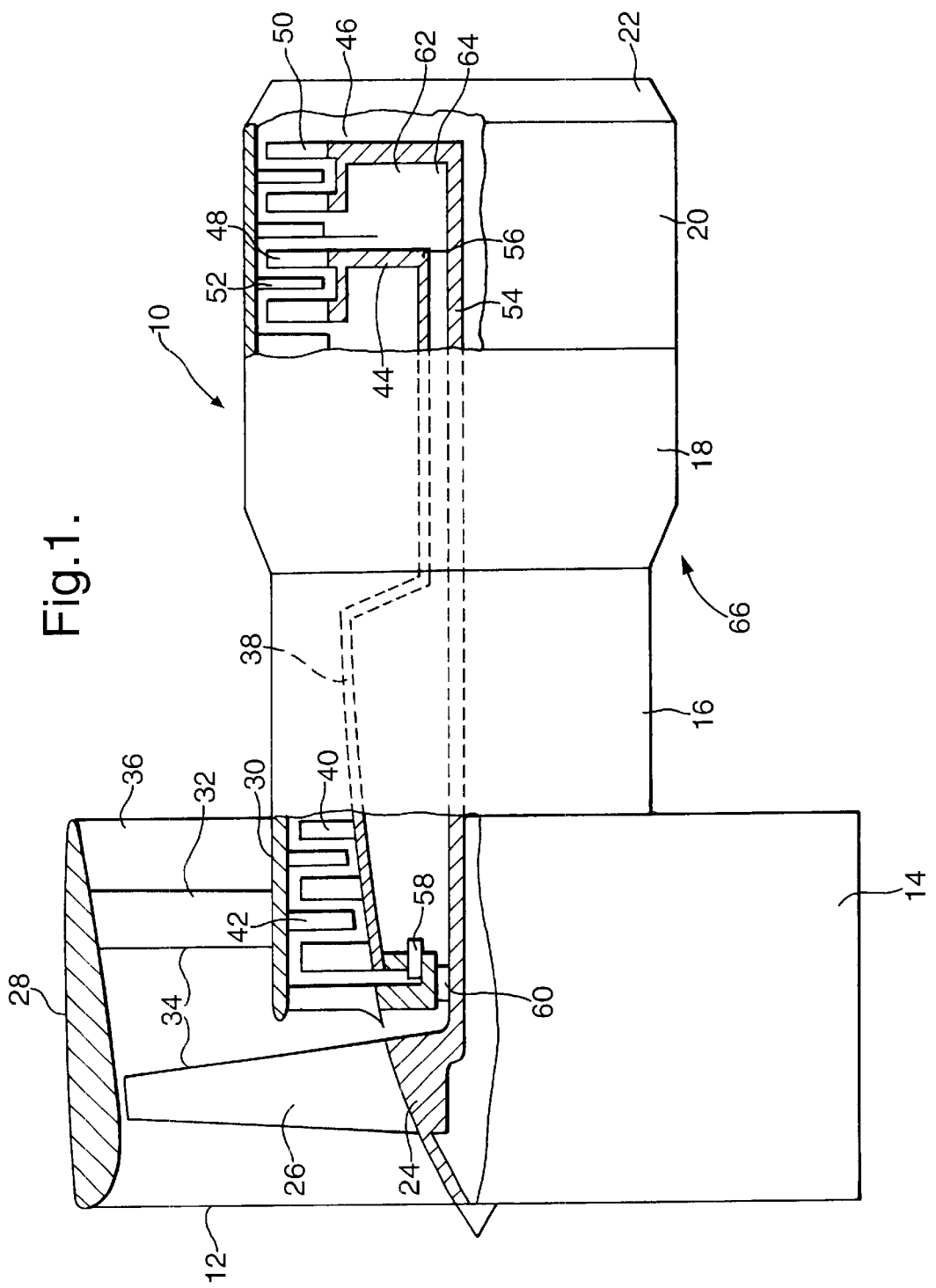
FIG. 1 shows a gas turbine engine having an electrical conductor winding according to the present invention.

A gas turbine engine 10, as shown in FIG. 1, comprises in axial flow series an inlet 12, a fan section 14, a compressor section 16, a combustor section 18, a turbine section 20 and an exhaust 22.

The fan section 14 comprises a fan rotor 24 carrying a plurality of radially outwardly extending fan blades 26. The fan section 14 also comprises a fan casing 28, which encloses the fan rotor 24 and fan blades 26. The fan casing 28 is secured to a core casing 30 by a plurality of radially extending fan outlet guide vanes 32 and the fan casing 28 defines a fan duct 34 which has an exhaust 36.

The compressor section 16 comprises a compressor rotor 38 carrying a plurality of stages of radially outwardly extending compressor blades 40 and the casing 30 has a plurality of stages of radially inwardly extending compressor vanes 42.

The turbine section 20 comprises a plurality of turbine rotors 44 and 46. Each turbine rotor 44 and 46 carrying a plurality of stages of radially outwardly extending turbine blades 48 and 50 respectively. A plurality of stages of radially inwardly extending turbine vanes 52 are provided.

The turbine rotor 46 is drivingly connected to the fan rotor 24 by a shaft 54 and the turbine rotor 44 is drivingly connected to the compressor rotor 38 by a shaft 56. The shafts 54 and 56 are mounted in active magnetic bearings 58, 60, 62 and 64. The shaft 54 has an electric generator/motor 66. The electric generator/motor 66 may be used for producing electricity for engine accessories and or aircraft equipment etc. or may be used to drive the shaft to start the gas turbine engine 10.

Figure 2:
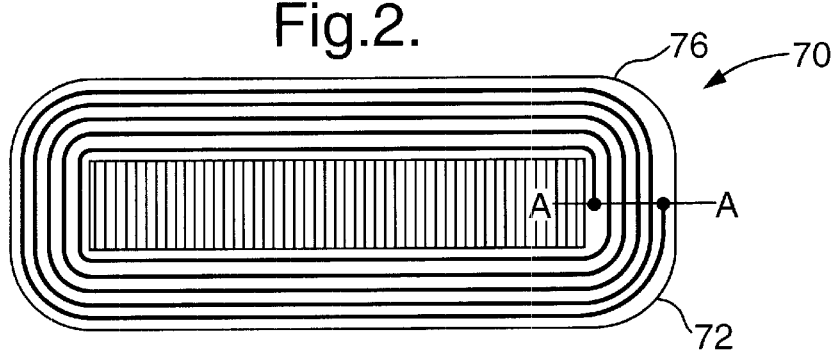
FIG. 2 shows a plan view of an electrical conductor winding showing one laminate of electrical insulation and its associated electrical conductor.
Figure 3:
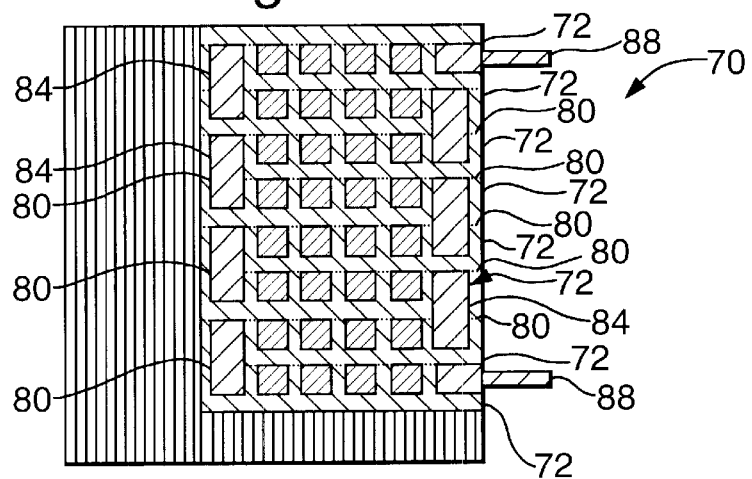
FIG. 3 is an enlarged cross-sectional view along the line A—A through the electrical conductor winding shown in FIG. 3.
Figure 4:
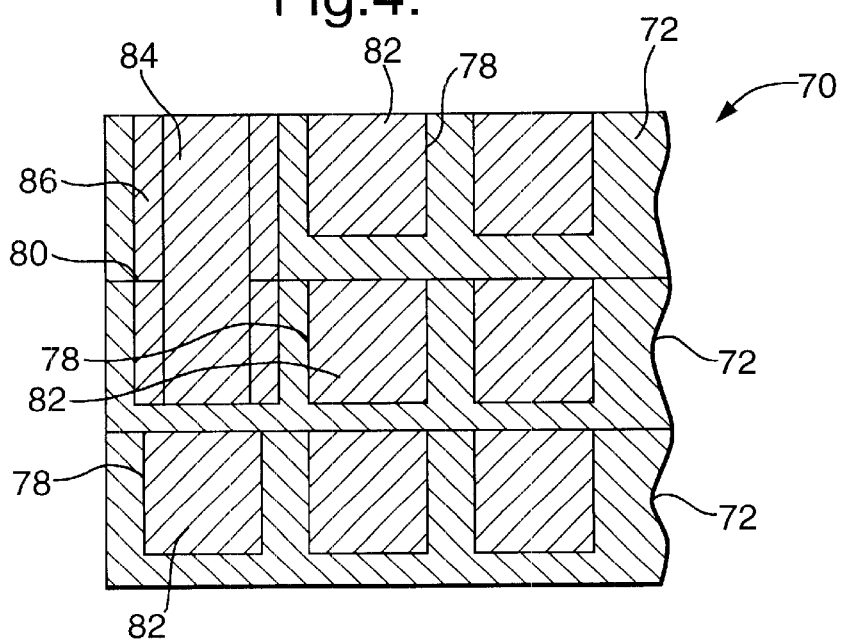
FIG. 4 is an enlarged cross-sectional view of part of the electrical conductor winding in FIG. 4 showing an electrical connector.
Figure 5:
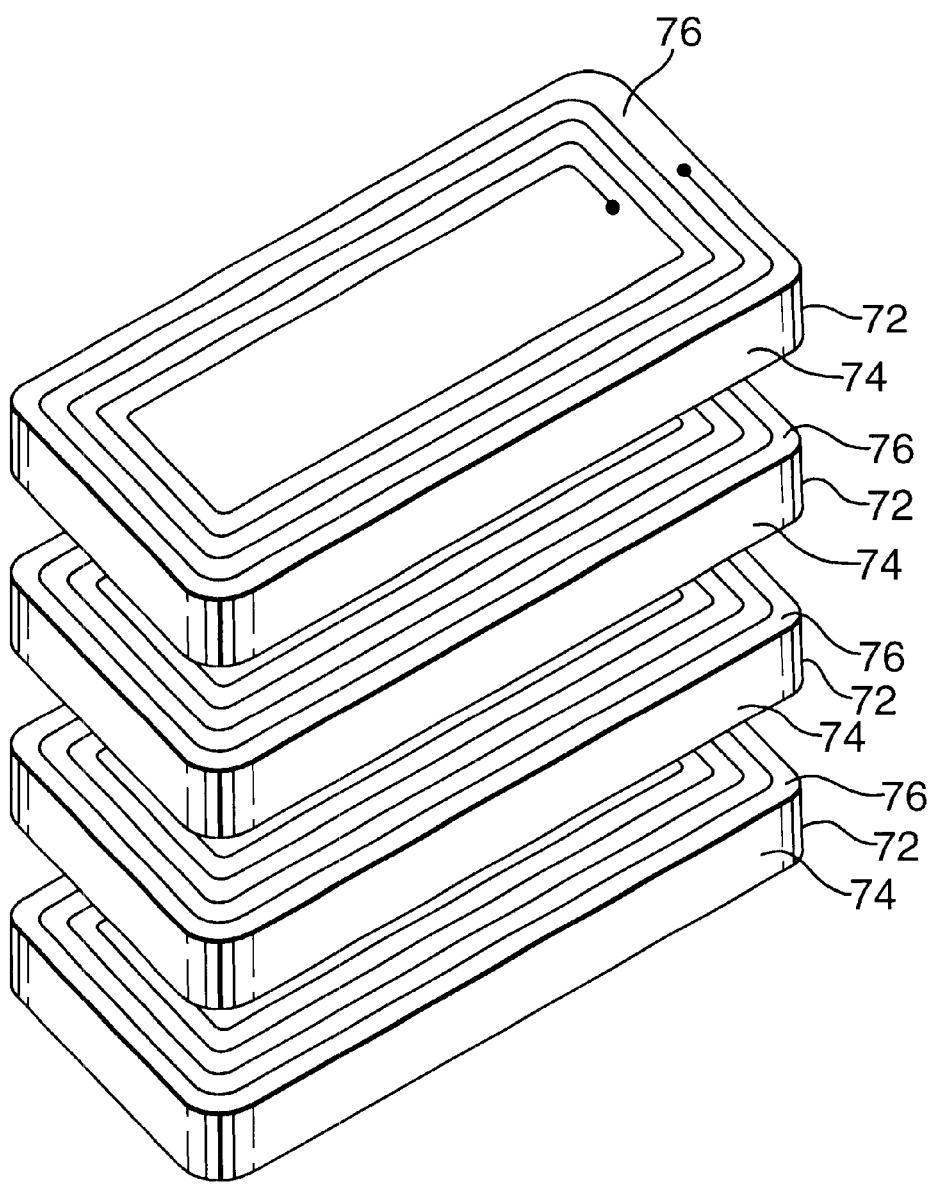
FIG. 5 is an exploded perspective view of a stack of laminates of electrical insulation.

The active magnetic bearings 58, 60, 62 and 64 and the electric generator/motor 66 comprise one or more electrical conductor windings 70 as shown in FIGS. 2, 3 and 4.

Each electrical conductor winding 70 comprises a plurality of laminates of electrical insulation 72. Each laminate of electrical insulation 72 has a first surface 74 and a second surface 76. The first surface 74 of each laminate of electrical insulation 72 is flat and the second surface 76 of each laminate of electrical insulation 72 has a slot 78. Each slot 78 is square, or rectangular, in cross-section. At least one aperture 80 extends through each laminate of electrical insulation 72 from the slot 78 to the first surface 74. The two laminates of electrical insulation 72 at the end of the electrical conductor winding 70 may have only one aperture 80, but all the other laminates of electrical insulation 72 have two apertures 80.

Each laminate of electrical insulation 70 has an electrical conductor 82 arranged in the slot 78. Each electrical conductor 82 is square, or rectangular, in cross-section. Each aperture 80 has an electrical connector 84 to connect the electrical conductor 82 in the slot 78 in one laminate of electrical insulation 72 with the electrical conductor 82 in the slot 78 in an adjacent laminate of electrical insulation 72. The electrical connectors 84 and apertures 80 are located at the ends of the electrical conductors 82. The electrical connectors 84 are brazed, or soldered, 86 to the electrical conductors 82.

The slots 78 and the electrical conductors 82 on each laminate of electrical insulation 72 are arranged in spirals.

The laminates of electrical insulation 72 are arranged such that the first surface 74 of one laminate of electrical insulation 72 abuts and is bonded to the second surface 76 of an adjacent laminate of electrical insulation 72.

The laminates of electrical insulation 72 comprise a glass-ceramic material. The glass-ceramic material comprises one or more phases whose combined thermal expansion substantially matches the thermal expansion of the electrical conductor. Such phases include cristobalite, lithium zinc silicate, lithium disilicate, lithium metasilicate, enstatite, clinoenstatite or calcium orthosilicate. The glass-ceramic material comprises for example 59.2 wt % $SiO_2$, 9.0 wt % $LiO_2$, 27.1 wt % ZnO, 2.0 wt % $K_2O$ and 2.7 wt % $P_2O_5$. This is believed to have an acceptable thermal expansion match with copper.

The electrical conductors 82 comprise copper, but the electrical conductors may comprise any other suitable electrically conducting or superconducting material, for example silver, gold etc.

The electrical connectors 84 comprise copper, but the electrical connectors may comprise any other suitable electrically conducting or superconducting material, for example silver, gold etc.

The particular glass-ceramic laminates of insulation material have a good match in thermal expansion coefficients with copper conductors.

An electrical conductor winding 70 is manufactured by press forming, or photo-forming, a plurality of laminates of electrical insulation 72 in the glassy state such that each laminate of electrical insulation 72 has a first surface 74 and a second surface 76. The first surface 74 is flat and the second surface 76 has a spiral slot 78. The laminates of electrical insulation 72 are then turned to a glass-ceramic.

An electrical conductor 82 is then placed in the slot 78 of each laminate of electrical insulation 72 by electroforming or electroplating or other suitable method. The electrical conductors 82 are deposited until they stand proud of the laminates of electrical insulation 72 and then the electrical conductors 82 are machined flush with the second surfaces 76 of the laminates of electrical insulation 72. The electrical conductor 82 may be placed in each laminate of electrical insulation 72 before, or after, the glass has been converted into a glass-ceramic.

Apertures 80 are drilled through the ends of the electrical conductor 82 and from the bottom of the slots 78 to the first surface 74 of the laminates of electrical insulation 72. Preferably the apertures through the laminates of electrical insulation 72 are formed at the same time as the slots 78. Alternatively the apertures 80 in the electrical conductor 82 are formed by placing removable plugs at the appropriate positions in the slots 78 before the electrical conductor 82 are deposited in the slots. The electrical conductor 82 is thus deposited around the plug and then the plug is removed.

Electrical connectors 84 are placed in the apertures 80 in each laminate of electrical insulation 72 to connect the electrical conductor 82 in the slot 78 in one laminate of electrical insulation 72 with the electrical conductor 82 in the slot 78 in an adjacent laminate of electrical insulation 72. The electrical connectors 82 are provided with solder, braze paste, braze foil or other suitable solder or braze material around the electrical connectors 84 to form an electrically conducting joint between the electrical conductors 82 and the electrical connectors 84. Additionally electrical leads 88 are provided to connect one end of the electrical conductors 82 in the end laminates of electrical insulation 72 to a power converter.

The laminates of electrical insulation 72 with respective electrical conductors 72 and electrical connectors 84 are stacked together such that the first surface 74 of one laminate of electrical insulation 72 abuts the second surface 76 of an adjacent laminate of electrical insulation 72.

The stack of laminates of electrical insulation 72 is transferred to a furnace and heated such the first surface 74 of one laminate of electrical insulation 72 fuses to bond the second surface 76 of an adjacent laminate of electrical insulation 72. Also the solder, or braze, melts to form the electrical connection between the electrical conductors 82 and the electrical connectors 84. The bond is formed by the direct fusing of the laminates of electrical insulation.

Alternatively a layer of glass powder is placed between adjacent laminates of electrical insulation 72 and the glass powder fuses to bond the laminates of electrical insulation 72.

The laminating step may also be used to convert the glass to a glass-ceramic material, thus dispensing with one process step.

An alternative method to produce the electrical conductor winding is to use lithography. In this case an electrical conductor ink, copper ink, is deposited onto a green glass-ceramic tape. A further method to produce the electrical conductor winding is to ink jet print an electrical conductor ink and glass-ceramic ink.

It may also be possible to include diodes, transistors or other electronic devices, electrical devices within the electrical conductor winding. As an example one of the laminates of electrical insulation may have two spirals of electrical conductor and a switch. The switch is a high temperature semiconductor switch formed from silicon carbide. The switch has two positions. In the first position the switch connects the two spirals of electrical conductor in electrical series, this is suitable for use at low speed operation. In the second position the switch connects the two spirals of electrical conductor in electrical parallel, this is suitable for high-speed operation.

The advantages of the present invention are that the electrical conductor winding has good packing density due to the use of square or rectangular cross-section electrical conductors. The thermal transfer between the electrical conductors 82 and the laminates of electrical insulation 72 is encouraged because the electrical conductors 82 and the laminates of electrical insulation 72 are in intimate contact. The fully dense glass-ceramic laminates of electrical insulation 72 have improved thermal conductivity relative to conventional polymer insulation and porous ceramics. The glass-ceramic laminates of electrical insulation 72 may be tailored to minimise the thermal expansion mismatch with the electrical conductors 82. The construction of the fully dense glass-ceramic laminates of electrical insulation 72 and electrical conductors 82 minimise the effects of moisture ingress and oil ingress compared to the conventional insulation. The thermal properties of the glass-ceramic laminates of electrical insulation 72 allow high current densities and operating temperatures than in the conventional insulation.

In the photo-forming, or photolithography, process for manufacturing the electrical conduction winding 70 a homogeneous precursor glass melt is cast and machined flat to form a glass sheet. The glass sheet is then covered with a mask which defines the required pattern of slots 78. Ultra violet light from an ultra violet lamp is directed through the mask onto the required regions of the glass sheet for a period of up to 24 hours depending on the intensity of the ultra violet light. A weak ultra violet lamp produces good resolution to a depth of 3 mm after 24 hours, but a more intense ultra violet lamp reduces the exposure time to less than 1 hour. The exposed glass sheet is then heat treated to introduce crystal nucleation and growth in the required regions of the glass sheet which have been exposed to the ultra violet light.

The heat treated glass sheet is then etched in an etching solution, for example a solution containing hydrofluoric acid. The etching solution differentially etches the glass sheet and the required region of glass sheet are etched faster than the remainder of the glass sheet due to the formation of crystalline glass-ceramic in the required regions by the exposure to ultra violet light and heat treatment.

The glass sheet is etched until the required depth for the slot 78 is produced and then the glass sheet is then cleaned. The etching time is dependent on the temperature and the composition and strength of the etching solution. The differential etching rate for a 10 vol % hydrofluoric acid is about 2 to 1, with the exposed and heat treated required region of the glass sheet dissolving more rapidly than the remainder of the glass sheet.

The glass sheet with the slot 78 is then heat treated to crystallise the remainder of the glass sheet to obtain the desired physical properties of the glass-ceramic material.

The glass required for the photo-forming process is a photosensitive glass and the resulting glass-ceramic has a coefficient of thermal expansion which substantially matches the coefficient of thermal expansion of the electrical conductor. The composition of a glass which is photo-formable comprises 13.29 wt % $LiO_2$, 9.19 wt % $Al_2O_3$, 5.20 wt % $K_2O$, 2.33 wt % $ZnO$, 0.35 wt % starch, 0.03 wt % $CeO_2$, 0.02 wt % AgCl and balance $SiO_2$ and incidental impurities. The resulting glass-ceramic material has a coefficient of thermal expansion of 16.2±0.2 $MK^{-1}$ and is matched to the coefficient of thermal expansion of copper.

For example the low intensity ultra violet lamp had an intensity of 640 $\mu W/cm^2$ at 7.5 cm and V=60 Hz. The crystal nucleation heat treatment is maintained at 500–550° C. for about 12 minutes, eg 520° C., and then heat treatment at 600–700° C. for about 3 hours, eg 650° C.

A further glass composition which is photo-formable comprises 12.0 wt % $Li_2O$, 6.0 wt % $Al_2O_3$, 3.50 wt % $K_2O$, 0.35 wt % starch, 0.03 wt % $CeO_2$, 0.02 wt % AgCl and the balance $S_iO_2$ and incidental impurities. The resulting glass-ceramic material has a coefficient of thermal expansion of 12.5±0.2 $MK^{-1}$. This is not as close a match as the above mentioned glass composition.

Preferred glass composition is 12 to 14.5 wt % $LiO_2$, 2 to 2.6 wt % ZnO, 4.7 to 5.7 wt % $K_2O$, 8.2 to 10.2 wt % $Al_2O_3$, 0.31 to 0.39 wt % starch, 0.027 to 0.033 wt % $CeO_2$, 0.018 to 0.022 wt % AgCl and balance $S_iO_2$ plus incidental impurities.

We claim:

1. An electrical conductor winding comprising a plurality of laminates of electrical insulation, each laminate of electrical insulation having a first surface and a second surface, the first surface of each laminate of electrical insulation being flat and the second surface of each electrical insulation having a slot, at least one aperture extending through each laminate of electrical insulation from the slot to the first surface, each laminate of electrical insulation having an electrical conductor arranged in the slot, each aperture having an electrical connector to connect the electrical conductor in the slot in one laminate of electrical insulation with the electrical conductor in the slot in an adjacent laminate of electrical insulation, the laminates of electrical insulation being arranged such that the first surface of one laminate of electrical insulation abuts and is bonded to the second surface of an adjacent laminate of electrical insulation and the laminates of electrical insulation comprises a glass-ceramic material, the glass-ceramic material comprises at least one phase whose combined thermal expansion substantially matches the thermal expansion of the electrical conductor.

2. An electrical conductor winding as claimed in claim 1 wherein the at least one phase is selected from the group consisting of cristobalite, lithium zinc silicate, lithium disilicate, lithium metasilicate, enstatite, clinoenstatite and calcium orthosilicate.

3. An electrical conductor winding as claimed in claim 1 wherein the glass-ceramic material comprises silica, lithium oxide, zinc oxide, potassium oxide and phosphorus oxide.

4. An electrical conductor winding as claimed in claim 1, wherein the glass-ceramic material comprises 59.2 wt % $SiO_2$, 9.0 wt % $LiO_2$, 27.1 wt % ZnO, 2.0 wt % $K_2O$ and 2.7 wt % $P_2O_5$.

5. An electrical conduction winding as claimed in claim 1 wherein the glass material comprises 12 to 14.5 wt % $Li_2O$ 2 to 2.6 wt % ZnO, 4.7 to 5.7 wt % $K_2O$, 8.2 to 10.2 wt % $Al_2O_3$, 0.31 to 0.39 wt % starch, 0.027 to 0.033 wt % $CeO_2$, 0.018 to 0.022 wt % AgCl and the balance $SiO_2$ plus incidental impurities.

6. An electrical conductor winding as claimed in claim 1 wherein the electrical conductors comprise copper.

7. An electrical conductor winding as claimed in claim 1 wherein the electrical connectors comprise copper.

8. An electrical conductor winding as claimed in claim 1 wherein the electrical connectors are brazed to the electrical conductors.

9. An electrical conductor winding as claimed in claim 1 wherein the electrical connectors are soldered to the electrical conductors by high electrical conductivity solder.

10. An electrical conductor winding as claimed in claim 1 wherein at least one of the electrical conductors is wound into a spiral.

11. An electrical conductor winding as claimed in claim 10 wherein each of the electrical conductors is wound into a spiral.

12. An electrical machine comprising an electrical conductor winding as claimed in claim 1.

13. An electrical machine as claimed in claim 12 wherein the electrical machine comprises an active electromagnetic bearing, an electrical generator or an electrical motor.

* * * * *